US009798825B1

(12) United States Patent   (10) Patent No.: US 9,798,825 B1
Goldman   (45) Date of Patent: Oct. 24, 2017

(54) ACTIVE CONTEXT INFORMATION FOR AN OBJECT AND CONTEXTUALLY ASSOCIATED OBJECTS

(75) Inventor: Peninah R. Goldman, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 260 days.

(21) Appl. No.: 10/360,259

(22) Filed: Feb. 6, 2003

(51) Int. Cl.
*G06F 17/30* (2006.01)

(52) U.S. Cl.
CPC .. *G06F 17/30882* (2013.01); *G06F 17/30997* (2013.01)

(58) Field of Classification Search
CPC .... G06F 17/30882; G06F 9/4446; G09B 5/06
USPC ........ 715/705, 708, 714, 804, 825, 826, 808
See application file for complete search history.

(56) References Cited

U.S. PATENT DOCUMENTS

| | | | | |
|---|---|---|---|---|
| 5,001,710 A | * | 3/1991 | Gawrys et al. | 370/271 |
| 5,287,448 A | * | 2/1994 | Nicol et al. | 715/707 |
| 5,444,774 A | * | 8/1995 | Friedes | 379/266.01 |
| 5,581,684 A | * | 12/1996 | Dudzik et al. | 715/708 |
| 5,644,738 A | * | 7/1997 | Goldman et al. | 715/825 |
| 5,664,133 A | * | 9/1997 | Malamud et al. | 715/816 |
| 5,801,702 A | * | 9/1998 | Dolan et al. | 715/854 |
| 5,977,967 A | * | 11/1999 | Berner et al. | 715/826 |
| 6,189,012 B1 | * | 2/2001 | Mital et al. | 707/103 R |
| 6,260,063 B1 | * | 7/2001 | Ludtke et al. | 709/224 |
| 7,062,475 B1 | * | 6/2006 | Szabo et al. | 706/11 |
| 7,836,403 B2 | * | 11/2010 | Viswanathan et al. | 715/745 |
| 2003/0204815 A1 | * | 10/2003 | Edwards et al. | 715/513 |
| 2016/0098156 A1 | * | 4/2016 | Lin-Hendel | G06F 3/0482 715/738 |

FOREIGN PATENT DOCUMENTS

WO   WO 0203292 A2 * 1/2002

OTHER PUBLICATIONS

Code_Punk, "<Code_Punk>'s Advanced JavaScript Lesson 4: Persistent Windows", Jun. 14, 2002, http://web.archive.org/web/20020614080615/http://codepunk.hardwar.org.uk/ajs04.htm.*

(Continued)

*Primary Examiner* — Alvin Tan
(74) *Attorney, Agent, or Firm* — Terrile, Cannatti, Chambers & Holland, LLP; Kent B. Chambers

(57) ABSTRACT

An information system using active context technology allows a user to view and interact with a large amount of data disposed within multiple objects with relative ease, minimal time, and minimal interaction. An active context object allows an active context window to display labels, identifiers, and links for objects that are actively (e.g. presently) contextually associated with each other. Contextual association of objects can be determined by a user, inferred by the nature of each object, or automatically determined by an information system. In another embodiment, an active context window is persistently displayed to a user to allow the user to easily obtain information about contextually associated objects and easily allow the user to navigate among contextually associated objects. In one embodiment, the active context object can be transmitted to other users to allow each user to access contextually related objects and, thus, contextually related information.

30 Claims, 13 Drawing Sheets

(56) References Cited

OTHER PUBLICATIONS

Vogel, "Product Reviews—Utilities—MeltingPoint Personal", Jul. 1997, Dennis Publishing Limited, http://www.pcpro.co.uk/broadband/reviews/2217/meltingpoint-personal.html.*

Shneiderman, "Designing the User Interface: strategies for effective human-computer-interaction", Mar. 1998, Addison Wesley Longman, Inc., 3rd edition, pp. 448-454.*

MeltingPoint, "Using MeltingPoint", May 30, 1997, Docuwork, Inc., pp. 1-74, downloaded from http://web.archive.org/web/19970530235850/http://www.docuwork.com/download/mpManual.zip.*

Gerritsen et al, "Press Release", May 30, 1997, Docuwork, Inc., downloaded from http://web.archive.org/web/19970530235850/http://www.docuwork.com/download/ushoriz.zip.*

"MeltingPoint Overview", May 30, 1997, Docuwork, Inc., slides 1-16, downloaded from http://web.archive.org/web/19970530235850/http://www.docuwork.com/download/OVERVIEW.ZIP.*

\* cited by examiner

*Fig. 5*

ACTIVE CONTEXT INFORMATION FOR AN OBJECT AND CONTEXTUALLY ASSOCIATED OBJECTS

BACKGROUND OF THE INVENTION

Field of the Invention

The present invention relates in general to the field of information processing, and more specifically to a system and method for providing active context information, within an information processing system, which indicates the active context of an object in relation to contextually associated objects.

Description of the Related Art

Information processing systems include computer systems and other electronic data systems, such as personal digital assistants. Users often interact with applications and navigate through a variety of objects. The objects may be any displayable entity such as files, pages, or images. Objects selected during navigation may be contextually associated with each other. Knowledge of the context of a currently displayed file can improve the situational awareness of the user. For example, specific information related to (i) the contact, (ii) an employer of the contact, (iii) a location of the contact, (iv) any prior quotes to the contact, and (v) prior orders of the contact or company may all be contextually related to the event, such as a conversation, at hand.

Several problems arise from navigating to and accessing many different types of related information associated with a particular page, file, image, or other object. Inherent confusion exists when navigating to and accessing many different types of information, which are associated with a particular file, image, or other object. For example, a user may be working with a sales call center application. Files related to the customer, such as customer contact information, customer profile, current or previous sales quotes, and current or previous orders, may all be needed to appropriately converse with a client. Although contextually related, this information may not be stored in a composite file, but rather is often stored in individual files, which are separately accessed. The complexity and difficulty of the problem magnifies when the information system accessed by the user contains several objects, such as the objects associated with items (i) through (v). Additionally, the complexity and difficulty of the problem increases when the user navigates through many objects, only some of which are contextually related.

Another problem arises because often users are on the phone with customers, and time is of essence. The call center application user preferably needs virtually instant access to any information related to their customer client without waiting on slow networks, without excessive clicking through multiple screens, and without excessive load time.

Well-known "roll-over" or "mouse-over" technology permits a user to maneuver a curser over a particular object upon which additional information can be displayed about the object. However, such additional information lacks, for example, dynamic context, such as navigational history context, and linking ability.

Other well-known technologies use navigational hierarchy information in an attempt to solve the above problems. However, each file accessed during navigation is located at some point in the hierarchy, regardless of whether it is useful or not from a context perspective. Hyperlinks have also been provided as a way to link to associated documents. However, hyperlinks require load time and may not represent the particular information that a user desires. Inherent processing delays associated with, for example, processing the requested link and accessing, retrieving, and displaying the linked object pose particularly acute problems when engaged in real-time customer conversation. Conventional hierarchies not only often suffer from inherent processing delays but can also be large and lack contextual relationships. Thus, navigating through a hierarchy to locate contextual objects while engaged in real-time conversation can consume an unacceptable amount of time and tax a user's ability to focus on multiple tasks.

Another problem arises when multiple users work together on an endeavor where sharing information is beneficial. Conventional technology has failed to provide an efficient solution that allows multiple users to efficiently and easily access multiple contextually associated objects.

SUMMARY OF THE INVENTION

In one embodiment of the present invention, an information system using active context technology allows a user to view and interact with a large amount of data disposed within multiple objects with relative ease, minimal time, and minimal interaction. An active context object allows an active context window to display labels, identifiers, and links for objects that are actively (e.g. presently) contextually associated with each other. Contextual association of objects can be determined by a user, inferred by the nature of each object, or automatically determined by an information system. In another embodiment, an active context window is persistently displayed to a user to allow the user to easily obtain information about contextually associated objects and easily allow the user to navigate among contextually associated objects. In one embodiment, the active context object can be transmitted to other users to allow each user to access contextually related objects and, thus, contextually related information.

In one embodiment of the present invention, a method of using an electronic information system to provide context information associated with multiple objects available for display by the information system includes accessing a software application executing on the information system. The application includes instructions for displaying multiple objects that are displayable through user interaction with the application. The method further includes recording identifier and linking data of objects that are selected by a first user and identified as being contextually associated with each other. The method also includes displaying an active context list in a display, the active context list having the recorded identifier and linking data of the objects that have been selected by a user and identified as being contextually associated with each other.

In another embodiment of the present invention, an information system includes a processor, a memory coupled to the processor, wherein the memory includes instructions and data to allow the processor to display an active context window. The information system also includes a display coupled to the processor for displaying a user interface. The user interface includes an active context window that is populated with identifiers and active links to objects that are (i) selected by a user as being contextually related and (ii) recorded within the active context window to allow a user to navigate to contextually related objects through interaction with the active context window.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 3-9 depict displays of windows illustrating the development and use of active context windows.

DETAILED DESCRIPTION

Overview

Figure 1:
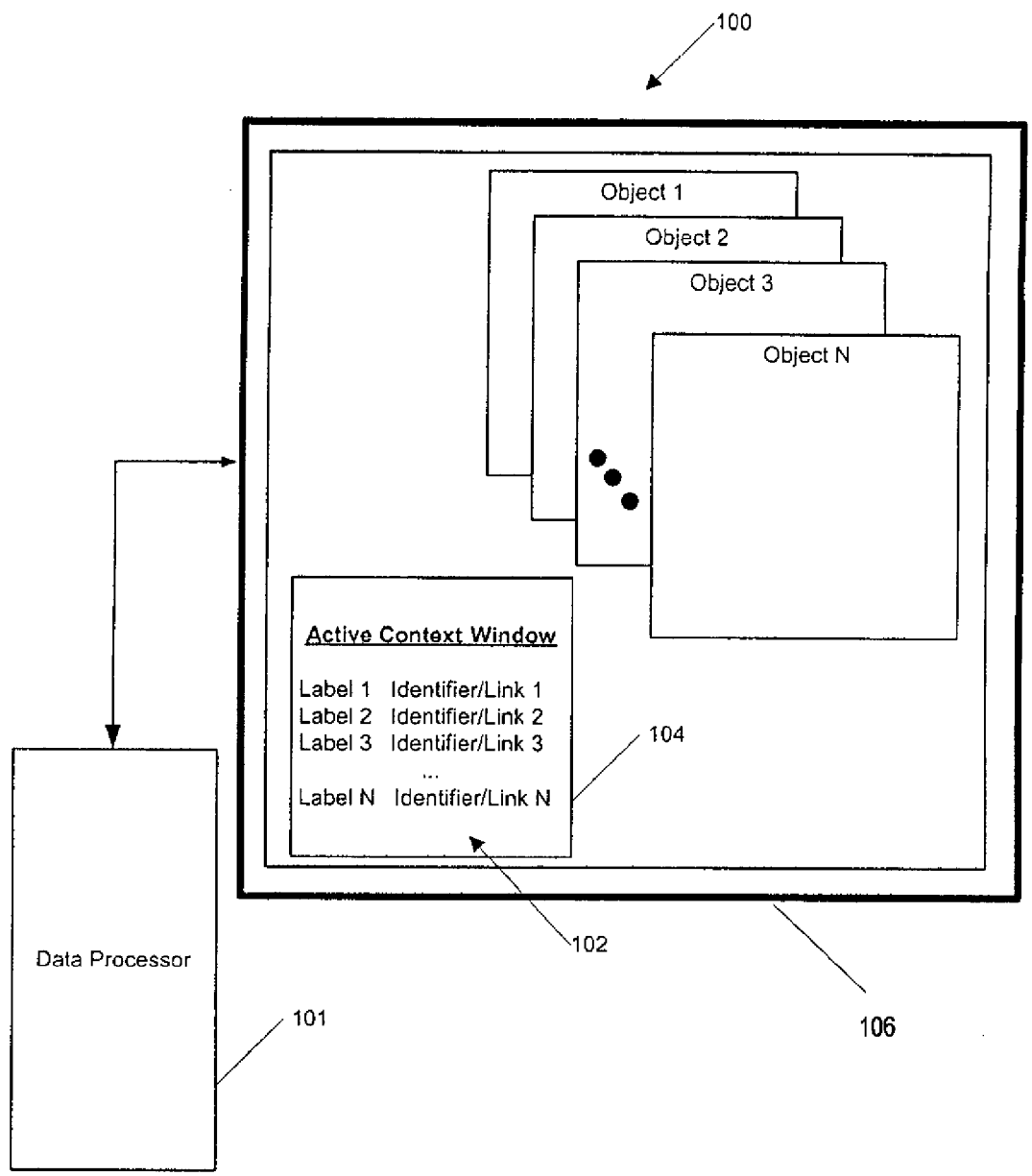
FIG. 1 depicts active context technology including the display of an active context window.

In one embodiment, an information system using active context technology allows a user to view and interact with a large amount of data disposed within multiple objects with relative ease, minimal time, and minimal interaction.

In one embodiment the active context technology includes a user interface component, referred to as an active context window, that simultaneously displays the active context of an object, such as a file, and serves as a navigational device to its associated objects. The term "active" is used in one sense to indicate that a set of related objects may change over time, for example, through user revision and/or system revision. In many environments such as sales and support environments, a user, such as a call center employee, may be engaged in a real-time conversation with a contact. Several pieces of information located in several different objects may be related to the conversation. Within a process, such as a sales process, there are generally many components to a deal. For example, there might be the (i) the contact, (ii) an employer of the contact, (iii) a location of the contact, (iv) any prior quotes to the contact, and (v) prior orders of the contact or company. Embodiments of the active context technology provide a relatively easy way to navigate to the information needed by a user through references to contextually associated objects. This is especially useful when multiple users work together and desire to review, comment, revise, etc. a particular set of information in, for example, a sales context.

In one embodiment, a user builds the active context of a particular event by first selecting an object. Each time a different associated object is accessed or created, an identifier and link to the associated object is added to an active context list. The active context list may reside in a designated window or pane of an information system display. Each object in the active context list may be associated with a link. The user may select the link to navigate to the linked object. If an object has not been associated to an object within the active context list, the user may select an identifier of the object for addition to the active context list. In another embodiment, the information system supporting the active context list includes filters that identify associated objects once they are selected by the user and automatically adds them to the active context list.

An active context object (described in more detail with reference to FIGS. 10 and 11) can be transmitted from a first user in, for example, an electronic message, to one or more other users. An active context object is accessible to an electronic information system to allow the system to produce an active context display, such as an active context window. Objects providing the active context of a particular event, such as a sales event, can easily be accessed using the active context object. This capability allows users to collaborate with each other. In this manner, when a recipient user refers to the active context object, the user will have access to all of its associated objects.

In addition to the conventional cost associated with access time, another so-called "click cost" is the psychological cost to a user resulting from the uncertainty of whether selecting a particular link will actually provide the desired object. If a user is too uncertain, especially in view of a constrained time event such as a live conference, the user may not be willing to spend the time to determine if the linked object is the desired object or not. In one embodiment of the active context technology, the psychological cost is ameliorated by using roll-over technology, such as mouse-over technology, to instantly display 'pop-up' information about contextual objects located in the active context list. The pop-up information could be of any desired content that will, for example, enable a user to avoid accessing another object or provide a user with confidence that navigating to a particular object would or would not be of useful.

Active Context Technology

A more detailed description of embodiment of the active context technology follows. FIG. 1 depicts active context technology 100. The data processor 101, such as a desktop or laptop computer, displays the active context list 102 within an active context window 104 of display 106 using conventional window display technology. In this embodiment, the active context list 102 includes N labels, wherein each of the N labels is preferably a generic identifier of an object and N is the total number of labels. The active context list 102 also associates an Identifier/Link with each label. Each Identifier/Link identifies a particular object and provides a selectable link to the identified object. Objects 1 through N represent, for example, files accessed by a user.

A software application executing on the data processor 101 records an Identifier/Link of each object selected by the user and identified as being contextually associated with one or more other objects. The record can be recorded, for example, in an active context object. The identification of a contextually associated object can be performed, for example, manually by the user, automatically through filtering or inference procedures executed by data processor 101, or a combination of manual and automatic. The various objects 1 through N may have been accessed during a conversation with a customer or may have been referenced in an active context object (described in more detail below). By interacting with the Identifier/Link, e.g. by clicking on the Identifier/Link, the user may select the linked object for display on display 106.

Figure 2:
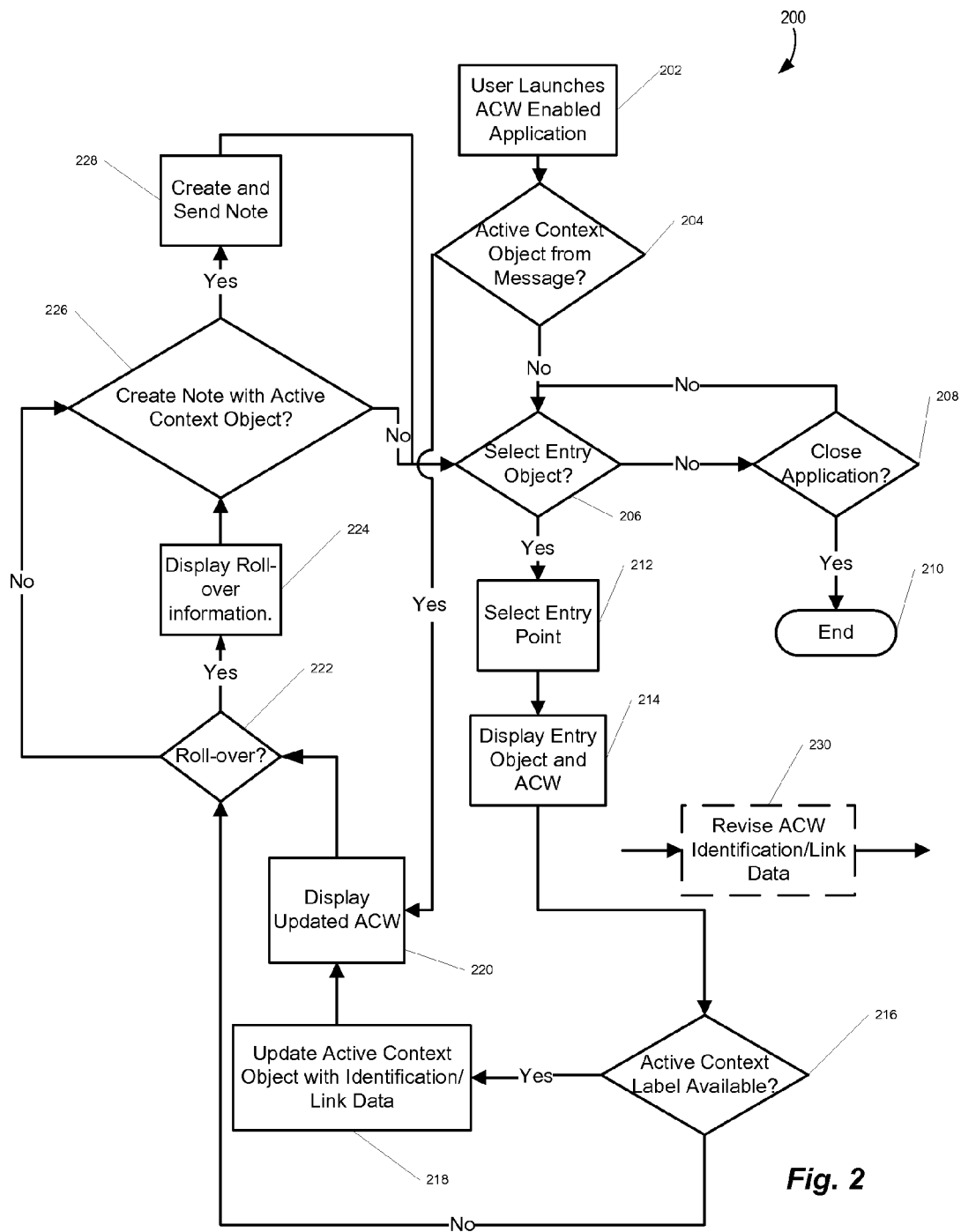
FIG. 2 depicts an active context process for populating, accessing, and transmitting active context information.
Figure 3:
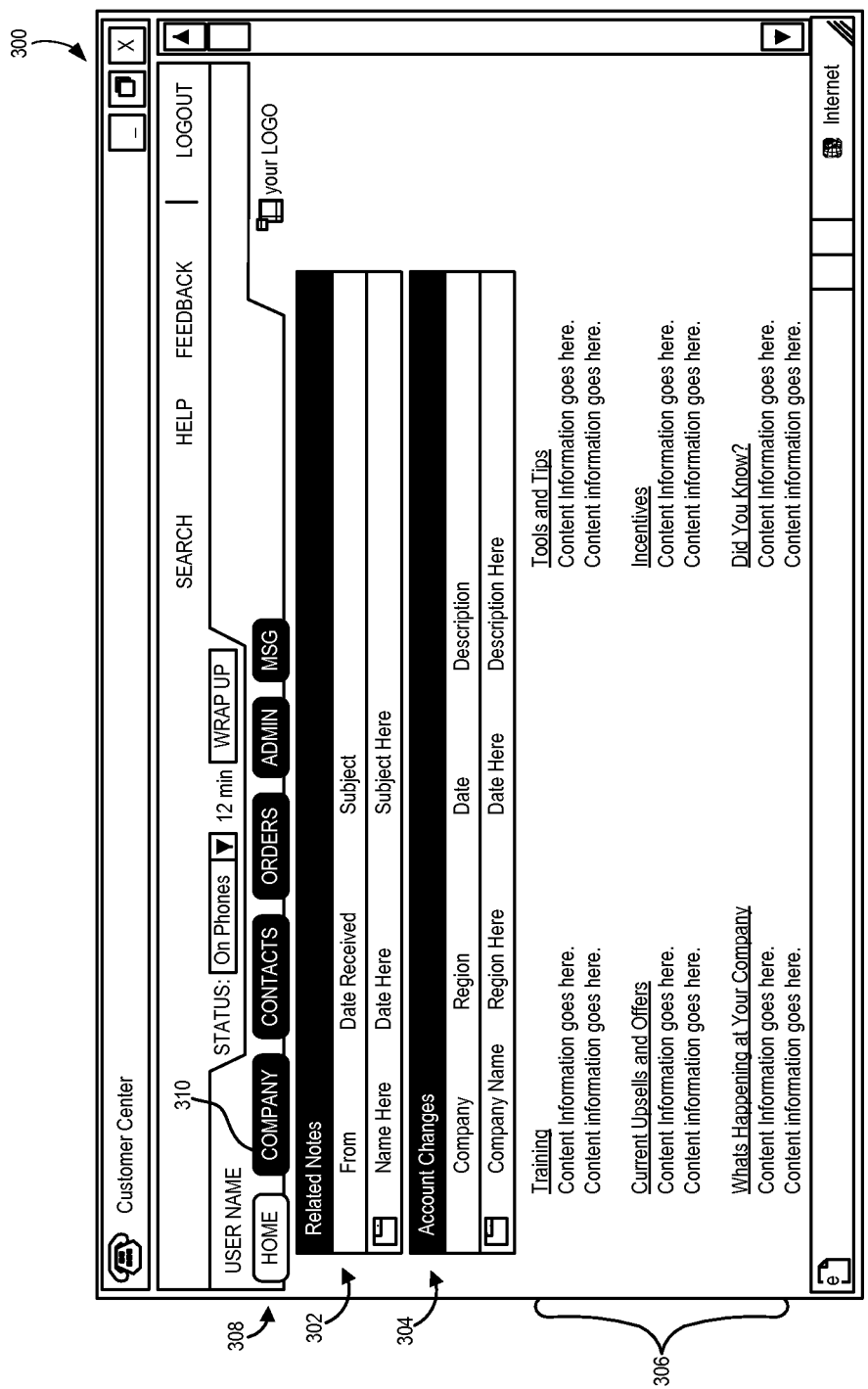

FIG. 2 depicts one embodiment of an active context process. The active context process 200 generally illustrates population of an active context list, display of an active context window ("ACW"), accessing contextually associated objects, transmitting active context information, and providing instant object details. The active context process 200 is described in conjunction with example displays of FIGS. 3-9.

Referring to FIGS. 2-9, in operation 202 a user launches a software application that can interact with an active context object and generate an active context window and other windows such as those depicted in FIGS. 3-9. One such application could be a call center application used by call center users. Upon launch, operation 202 displays a home page 300 user interface of a call center application identified as Customer Center. The home page 300 includes a variety of information fields 302-306. Tabs 308 provide links to other files. If an active context object is not available from a message, operation 204 causes active context process 200 to proceed to operation 206. In operation 206, the active context process 200 awaits the selection of an entry object, such as any of tabs 308, until the application is closed via operations 208 and 210. Returning to operation 206, a user interacts with display 300 and selects the company entry object 310, which causes the display of company page 400 user interface.

Figure 4:
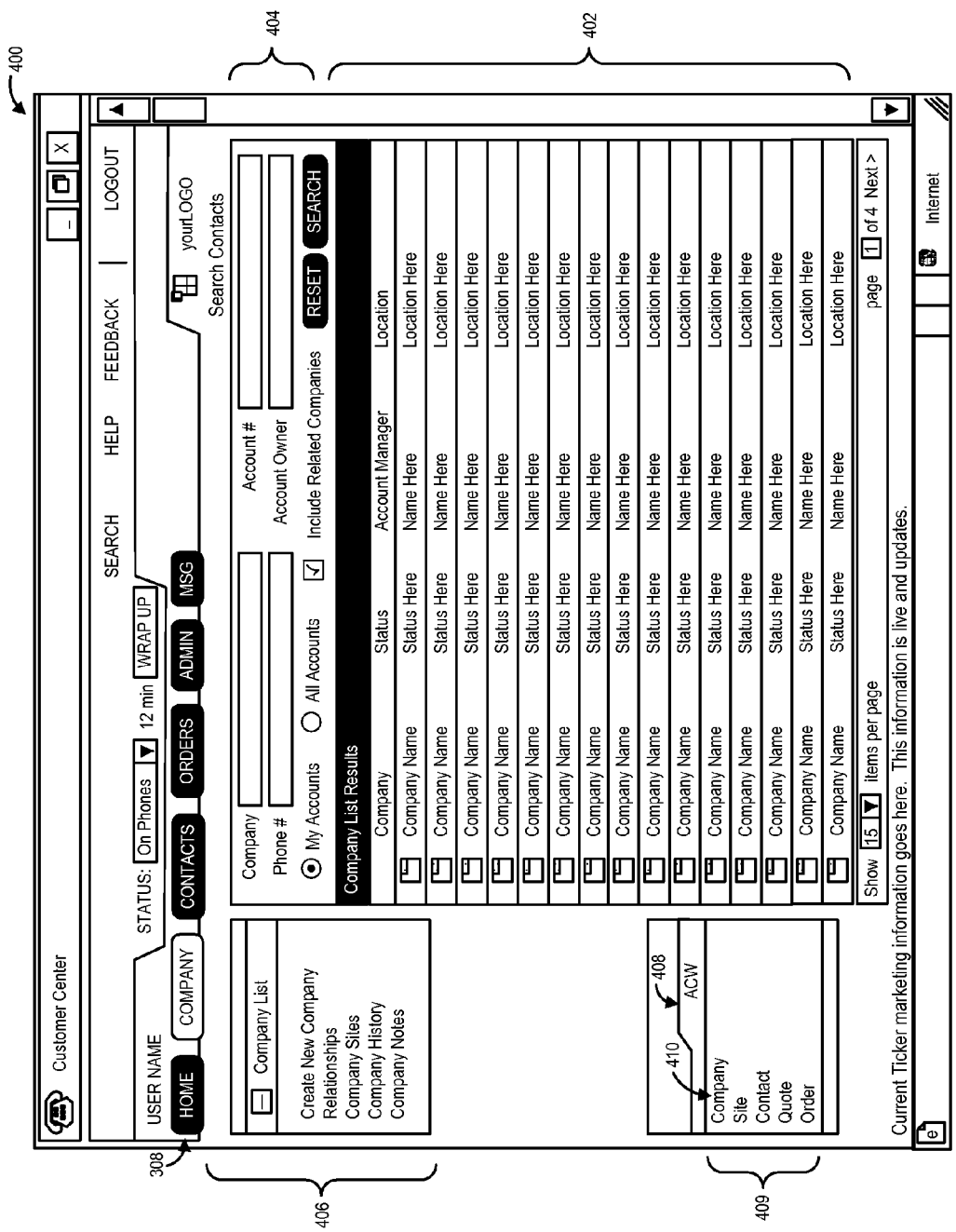

The company page 400 of FIG. 4 depicts a list of companies 402, search fields 404, and action fields 406 as well as tabs 308. The company page 400 also includes ACW 408. ACW 408 includes labels 410—"COMPANY", "SITE", "CONTACT", "QUOTE", and "ORDER"—. Currently, ACW 408 contains an active context list 409 that includes labels 410 but does not contain any Identifier/Links. In operation 212 a user selects an entry point, such as selecting a particular company from the list of companies 402. ACW 408 is preferably a persistent window.

Selection of a particular company in operation 212 causes operation 214 to display a company specific detail window 500 depicting various detail fields and other information for the selected company. Note: references to "Data Here" indicate fields containing specific data associated with the selected company. Operation 216 determines if the ACW 408 includes a label associated with the selected object, which in this instance is the company specific detail window 500. Operation 218 updates an active context object (described in more detail below) with an Identifier/Link 411 associated with company specific detail window 500. Operation 220 displays the updated ACW 408. Note: the particular text or image representing an Identifier/Link, such as "Company Name Here", can be automatically determined by operation 220 or determined by other mechanisms such as a text entry by the user. The Identifier/Link 411 is represented as a composite item to minimize the occupation of display space, but the identifier and link could be represented as separate items. Regardless of which page is currently displayed, selecting an Identifier/Link preferably instantly causes the linked object to be displayed.

Figure 5:
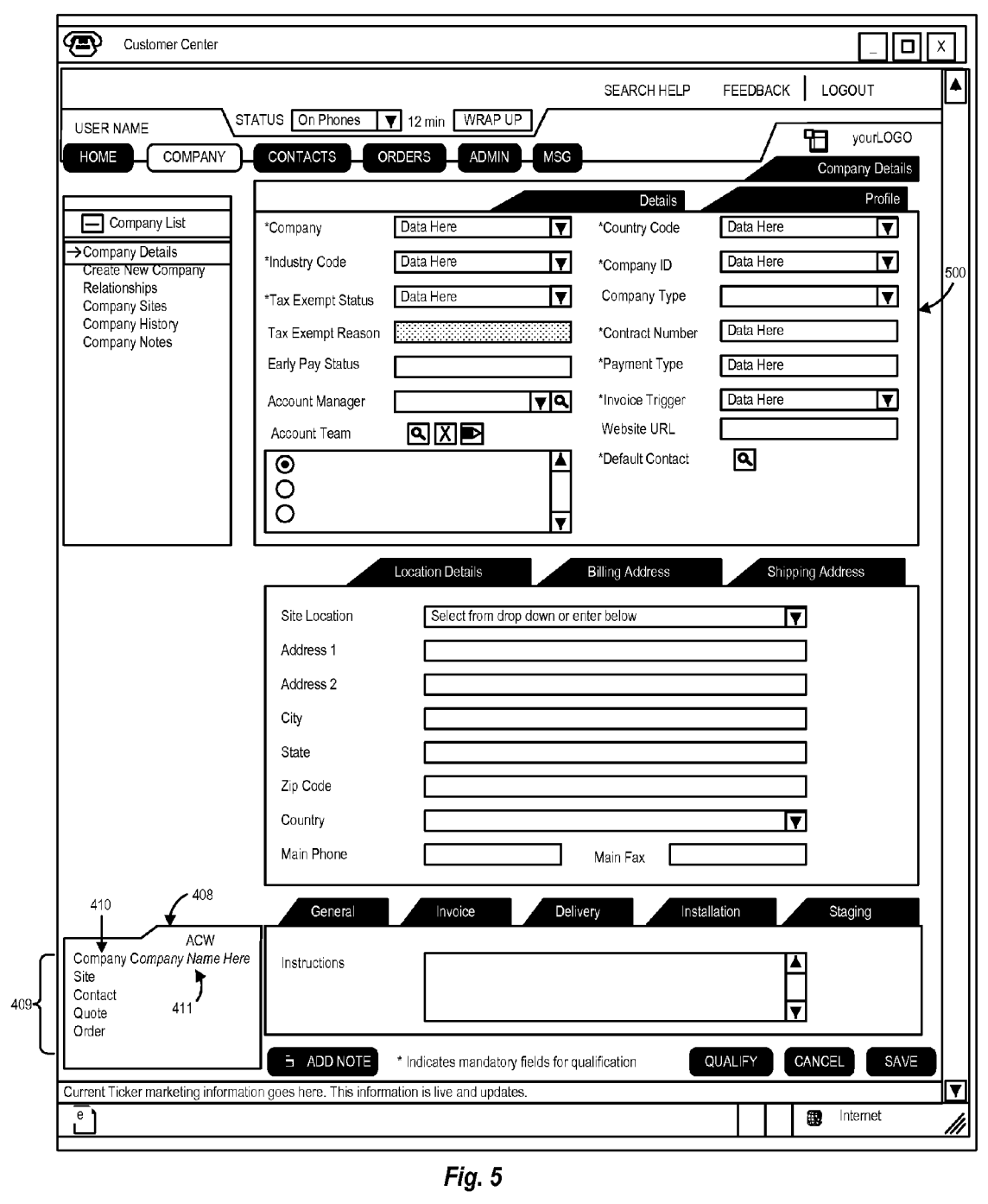

Referring to FIG. 5, operation 222 determines that a roll-over event has occurred as indicated by the user's cursor positioned over the Identifier/Link 411. Operation 224 detects the roll-over event and causes the company detail window 602 to pop-up. Thus, information about the associated company is instantly available, and the user is provided information that assists the user in identifying the object referenced by Identifier/Link 411. This information would be particularly beneficial to a recipient of an active context object created by another user. If the user does not desire to create a note with an active context object in operation 226, active context process 200 returns to operation 206.

Figure 6:
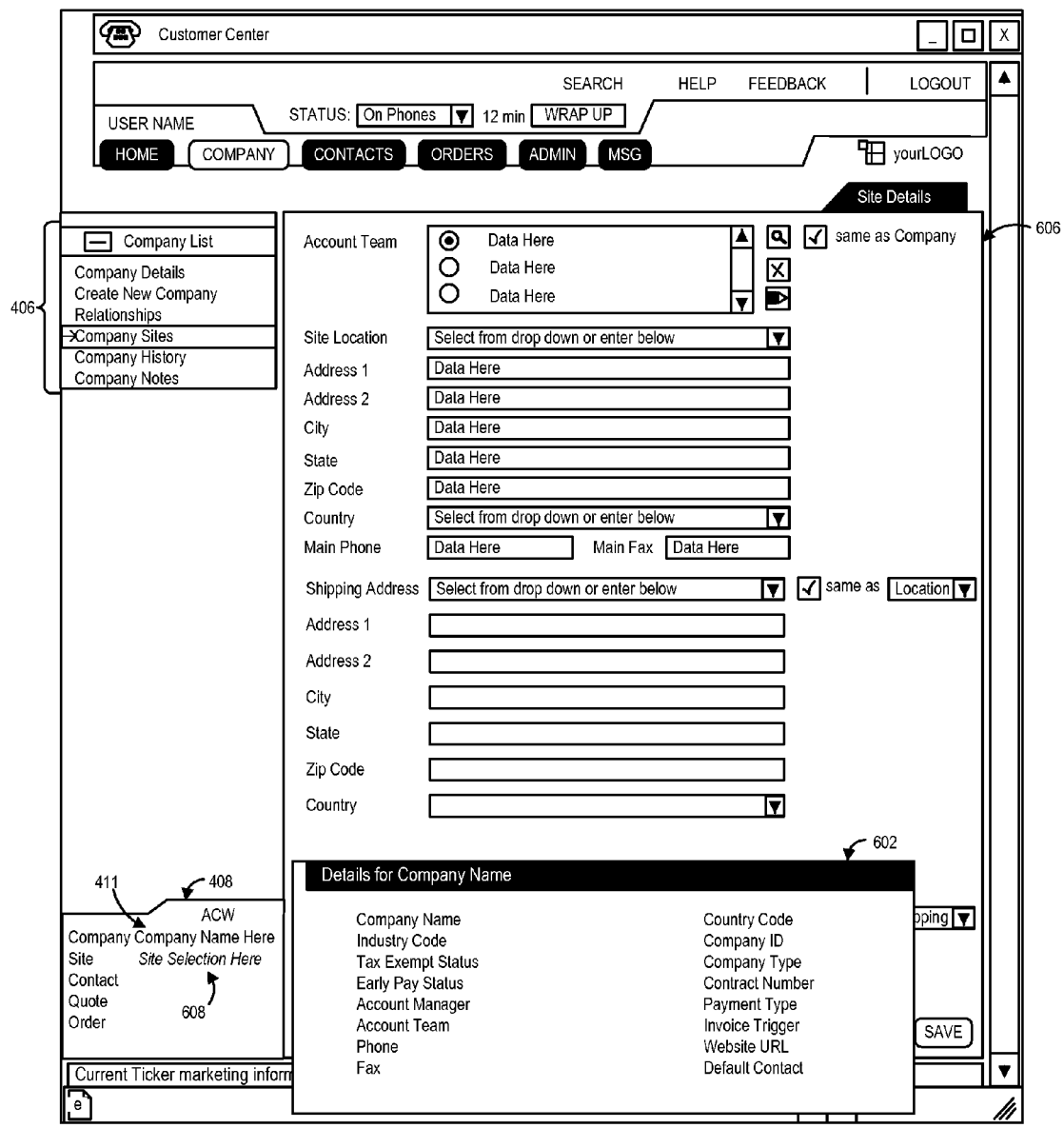

In operation 206, the entry object "Company Sites" is selected from the action list 406 as depicted in FIG. 6. The response to operation 204 is once again "no". In this instance, the entry object and entry point are the same, and operation 214 displays company site page 606 and ACW 408. Operation 216 determines that an active context label "Site" is available, and operation 218 updates the active context object with the "Site Selection Here" Identifier/Link 608, and operation 220 displays the ACW 408, both in the manner described above with reference to Identifier/Link 411. Operation 222 determines that there is no new roll-over event.

Figure 7:
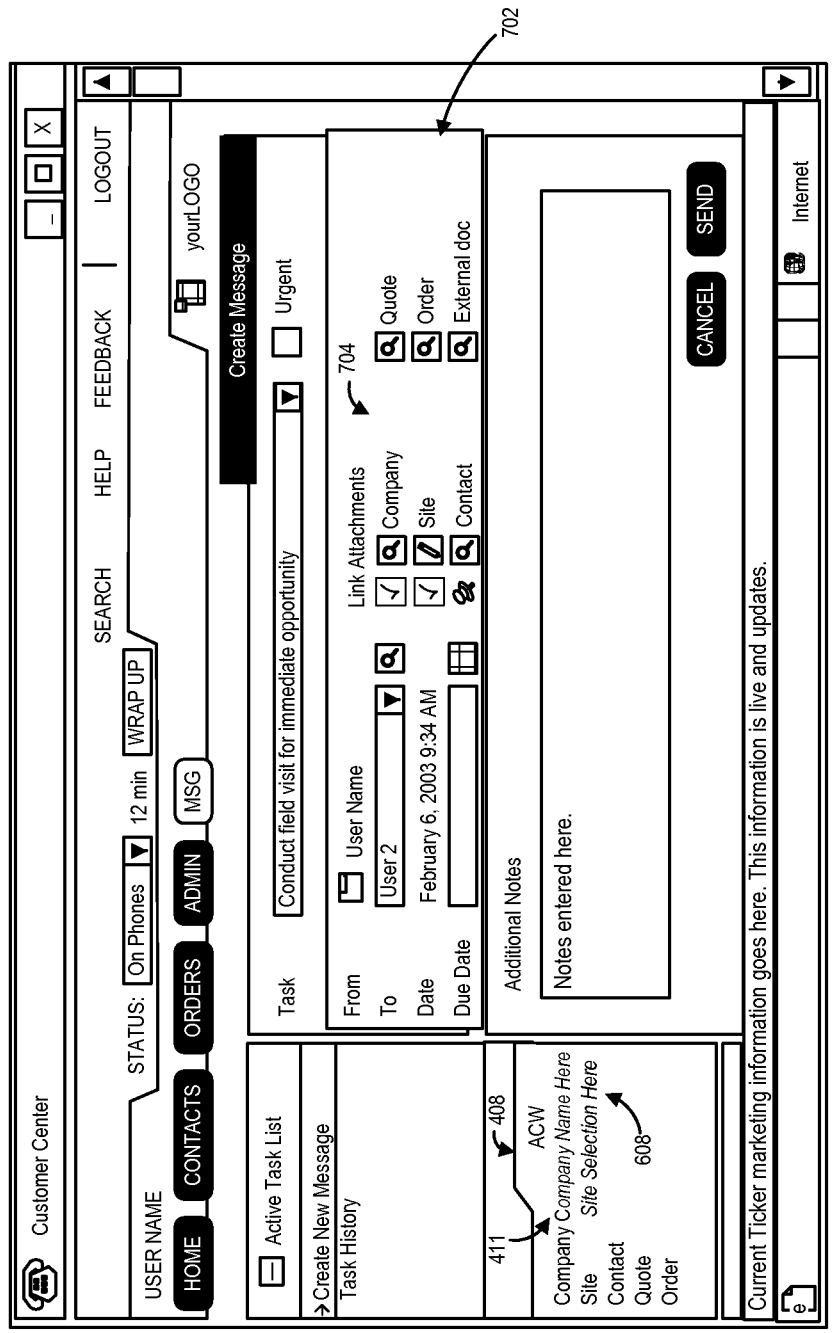

Referring to FIG. 7, in operation 226 the user selects Create New MSG operation 226, and operation 228 creates a message 702. The link attachments field 704 within message 702 includes the labels present in the ACW 408. Labels with populated Identifier/Links can be selected for inclusion in an active context object, which will be transmitted to USER 2 along with the message. In this embodiment, the user has selected both the Company and Site Identifier/Links 411 and 608.

When USER 2 opens the message 702 and launches the Customer Center application in operation 202, operation 204 determines that an active context object is available from message 702. An active context window is displayed in operation 220, and active context process 200 proceeds as described above. By having an active context window available with the contextually associated objects provided by a prior user, USER 2 is able to quickly and easily, for example, collaborate with the prior user(s) or continue the course of the prior user(s).

The ACW 408 can be revised by a user. Operation 230 is available to any user during any phase of active context process 200. Operation 230 allows a user to revise the contents of ACW 408 by, for example, clearing or changing and Identification/Link. In some embodiments, the user can revise the labels 410, and thus dynamically revise any filters used to record objects identified as being contextually associated with each other.

Figure 8:
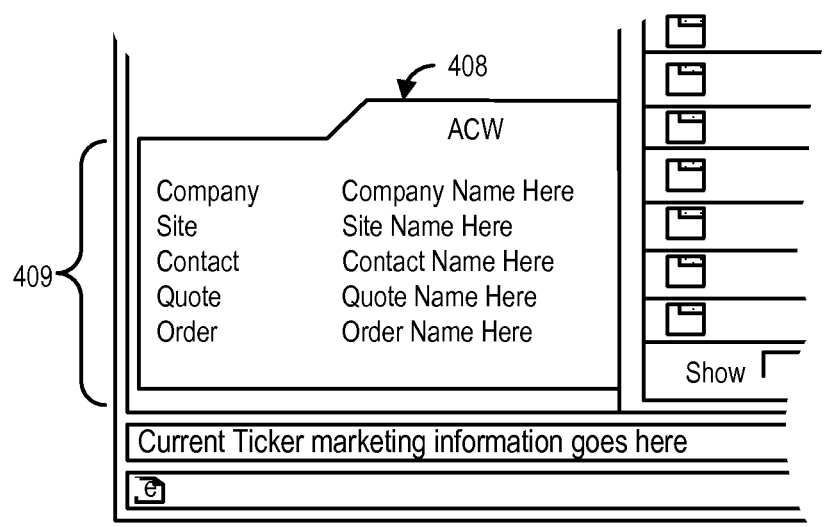

FIG. 8 depicts an embodiment of active context window 408 with an active context list 409 fully populated by recursively following active context process 200 as described herein.

Figure 9:
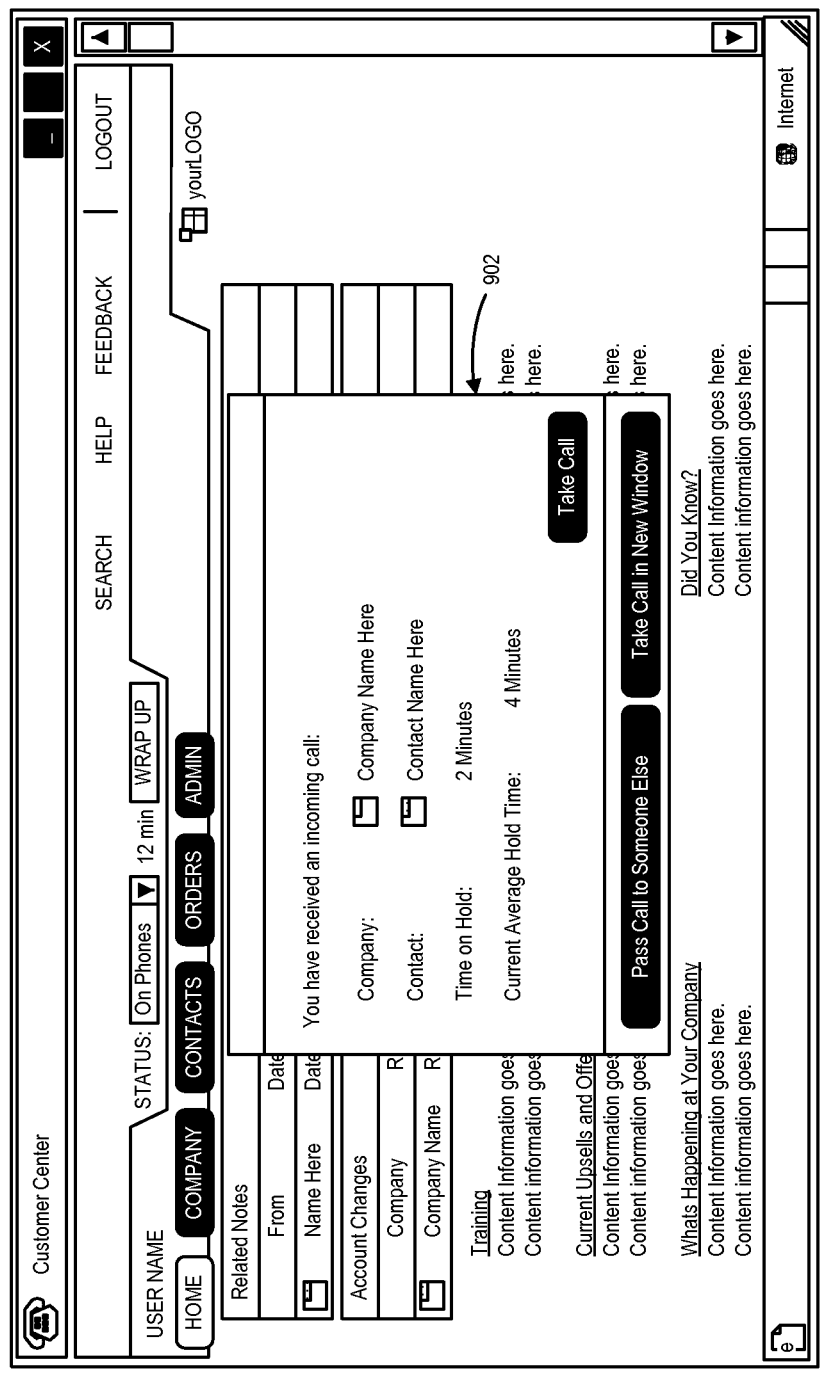

An active context object can be referenced by other objects, such as a company object or a contact object. FIG. 9 illustrates another entry into active context process 200. Window 902 displays information indicating that an incoming call has been received. Using identifying technology, such as caller-id, the incoming caller can be identified along with other information associated with the caller, such as the caller's company. By selecting the Contact or Company name field, an active context object referenced to the Contact or Company can be accessed. The active context process 200 can then proceed from operation 220 as described above.

Figure 10:
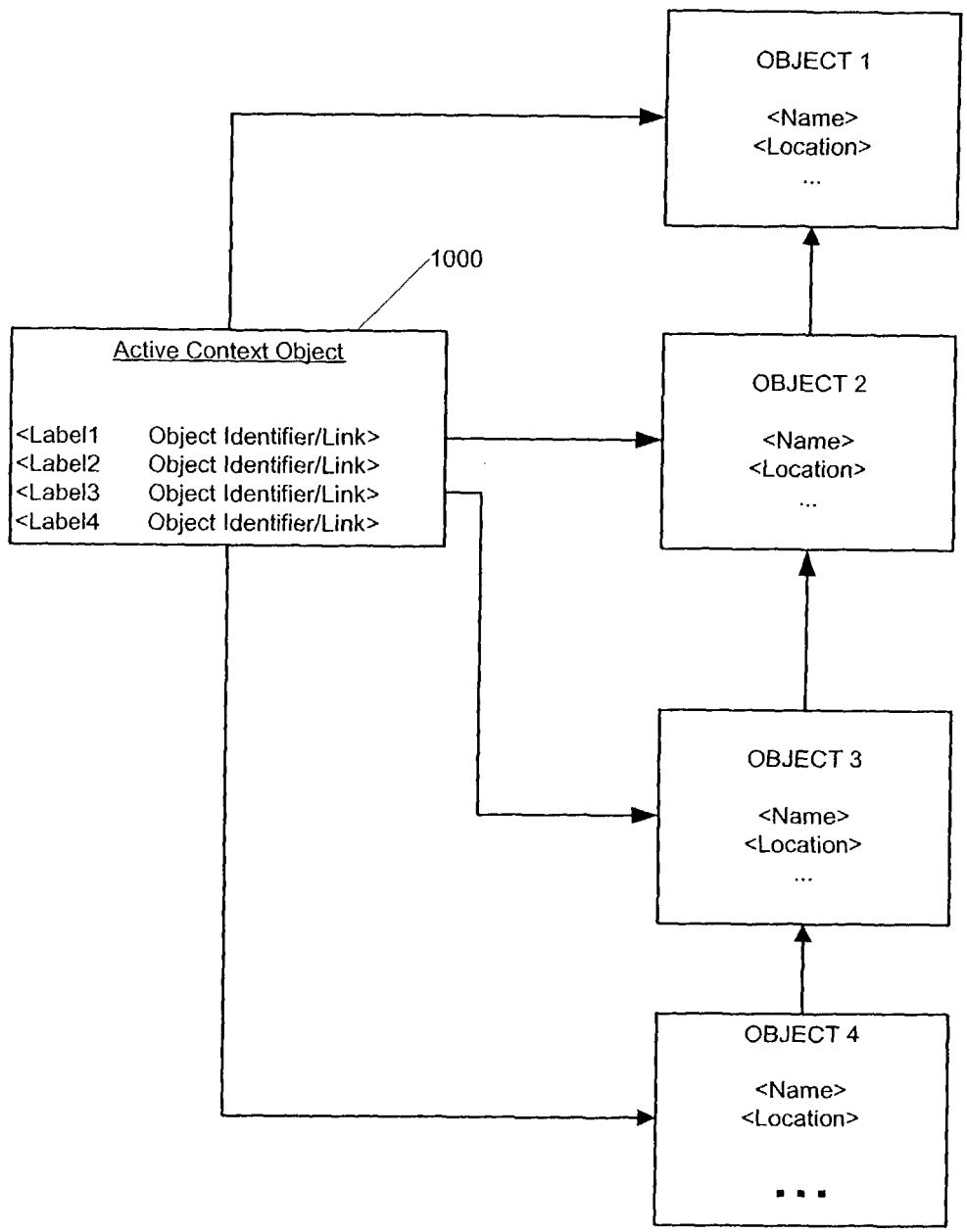
FIG. 10 depicts a general active context object and related objects.

FIG. 10 depicts multiple objects. The objects are used in a well-known manner to encapsulate data and functions. The objects can be used by an application to display images and data contained or referenced by the objects. One of the objects is an active context object 1000. The active context object 1000 includes references to all objects associated with the active context object 1000. For example, objects 1, 2, 3, and 4 are all referenced within active context object 1000. The references are created in active context object 1000 as described above through manual recording by a user and/or automatic recording by active context process 200 through the use of filters. The filters can be based on correlating Label data in active context object 1000 with name data in an object. The references can also be revised by accessing the active context object 1000 and revising the contents contained therein. Note also that objects that are contextually associated generally have references paths, indicated by the arrows between objects, that ultimately link all the contextually associated objects.

Figure 11:
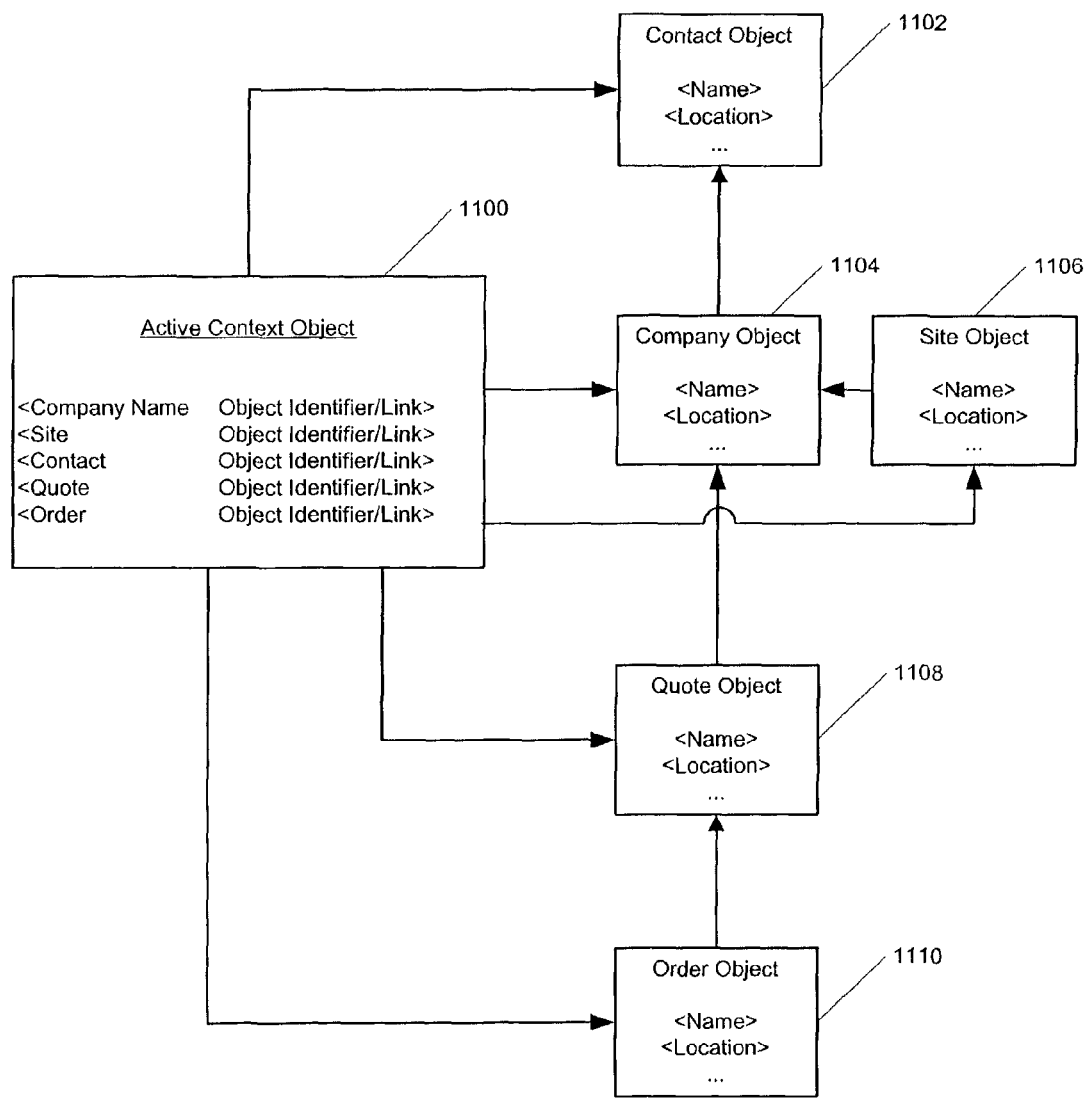
FIG. 11 depicts one embodiment of the active context object and related objects of FIG. 10.

FIG. 11 depicts the organization of active context object 1100 and referenced objects: Contact Object 1102, Company Object 1104, Site Object 1106, Quote Object 1108, and Order Object 1110. The organization and referencing architecture depicted in FIG. 11 is one manner by which the active context object 1100 can be used to generate ACW 408 and provide simple and efficient access to contextually related objects.

Figure 12:
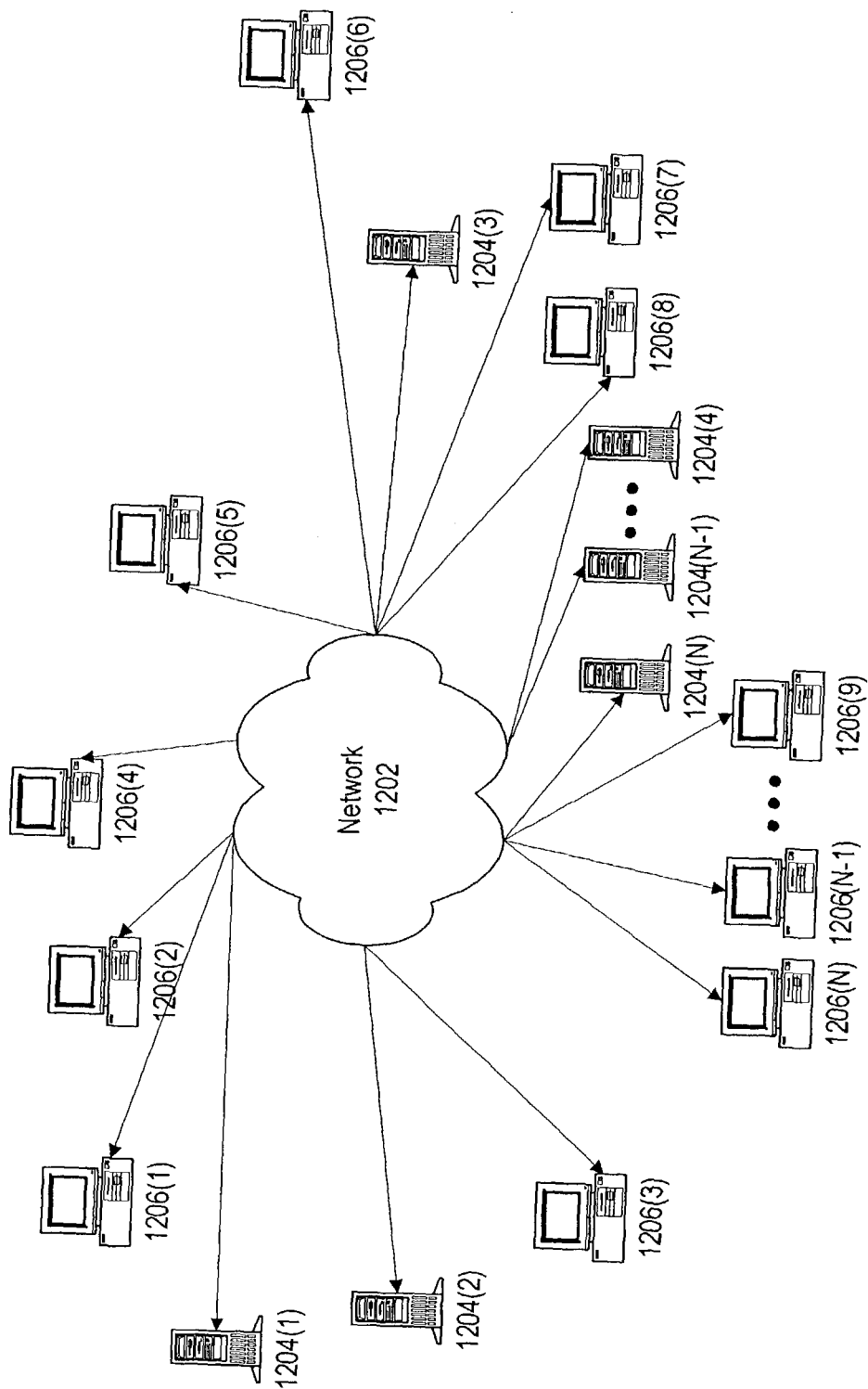
FIG. 12 a network environment in which active context technology may be practiced.

FIG. 12 is a block diagram illustrating a network environment in which the active context technology may be practiced. Network 1202 (e.g. a private wide area network (WAN) or the Internet) includes a number of networked server computer systems 1204(1)-(N) that are accessible by client computer systems 1206(1)-(N), where N is the number of server computer systems connected to the network. Communication between client computer systems 1206(1)-(N) and sewer computer systems 1204(1)-(N) typically occurs over a network, such as a public switched telephone network over asynchronous digital subscriber line (ADSL) telephone lines or high-bandwidth trunks, for example communications channels providing T1 or OC3 service. Client computer systems 1206(1)-(N) typically access server computer systems 1204(1)-(N) through a service provider, e.g., an Internet service provider, and the like by executing application specific software, commonly referred to as a browser, on one of client computer systems 1206(1)-(N).

Client computer systems 1206(1)-(N) and/or server computer systems 1204(1)-(N) may be, for example, computer systems of any appropriate design, including a mainframe, a mini-computer, a personal computer system, or a wireless, mobile computing device. These computer systems are typically information handling systems, which are designed to provide computing power to one or more users, either locally or remotely. Such a computer system may also include one or a plurality of input/output ("I/O") devices coupled to the system processor to perform specialized functions. Non-transitory, mass storage devices such as hard disks, CD-ROM drives and magneto-optical drives may also be provided, either as an integrated or peripheral device. One such example computer system is shown in detail in FIG. 13.

Figure 13:
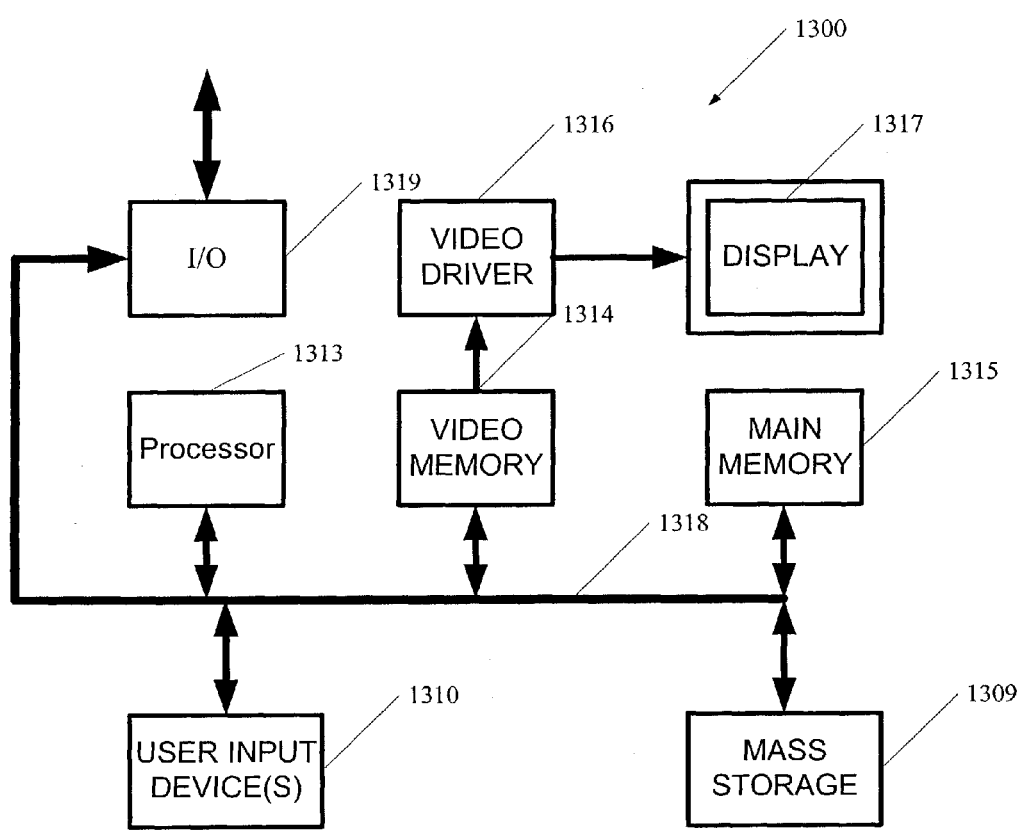
FIG. 13 illustrates a general purpose computer system.

Embodiments of the active context technology 100 can be implemented on an information system such as a general-purpose computer 1300 illustrated in FIG. 13 or other information systems, such as personal digital assistants. Input user device(s) 1310, such as a keyboard and/or mouse, are coupled to a bi-directional system bus 1318. The input user device(s) 1310 are for introducing user input to the computer system and communicating that user input to processor 1313. The computer system of FIG. 13 also includes a video memory 1314, main memory 1315 and mass storage 1309, all coupled to bi-directional system bus 1318 along with input user device(s) 1310 and processor 1313. The mass storage 1309 may include both fixed and removable media, such as other available mass storage technology. Bus 1318 may contain, for example, 32 address lines for addressing video memory 1314 or main memory 1315. The system bus 1318 also includes, for example, an n-bit DATA bus for transferring DATA between and among the components, such as CPU 1309, main memory 1315, video memory 1314 and mass storage 1309, where "n" is, for example, 32 or 64. Alternatively, multiplex DATA/address lines may be used instead of separate DATA and address lines.

I/O device(s) 1319 may provide connections to peripheral devices, such as a printer, and may also provide a direct connection to a remote server computer systems via a telephone link or to the Internet via an internet service provider (ISP). I/O device(s) 1319 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 1309 until loaded into main memory 1315 for execution. Computer programs may also be in the form of electronic signals modulated in accordance with the computer program and data communication technology when transferred via a network. The method and functions relating to embodiments of active context technology 100 may be implemented in a computer program executed by an information system.

The processor 1313, in one embodiment, is a 32-bit microprocessor manufactured by Motorola, such as the 680120 processor or microprocessor manufactured by Intel, such as the 801286, or Pentium processor. However, any other suitable single or multiple microprocessors or microcomputers may be utilized. Main memory 1315 is comprised of dynamic random access memory (DRAM). Video memory 1314 is a dual-ported video random access memory. One port of the video memory 1314 is coupled to video amplifier 1316. The video amplifier 1316 is used to drive the display 1317. Video amplifier 1316 is well known in the art and may be implemented by any suitable means. This circuitry converts pixel DATA stored in video memory 1314 to a raster signal suitable for use by display 1317. Display 1317 is a type of monitor suitable for displaying graphic images.

The computer system described above is for purposes of example only. The active context technology 100 may be implemented in any type of computer system or programming or processing environment. It is contemplated that the active context technology 100 might be run on a stand-alone computer system, such as the one described above. The active context technology 100 might also be run from a server computer systems system that can be accessed by a plurality of client computer systems interconnected over an intranet network. Finally, portions of the active context technology, such as the software application supporting the active context windows and the objects depicted in FIGS. 10 and 11 may be run from a server computer system that is accessible to a client computer system(s) over a network such as the Internet.

Many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it should be understood that various changes, substitutions and alterations can be made hereto without departing from the spirit and scope of the invention as defined by the appended claims.

What is claimed is:

1. A method of using a first computer system to provide context information associated with multiple objects available for display by the information system, the method comprising:

performing by a processor executing code in the first computer system to configure the first computer system into a machine:

accessing a software application executing on the first computer system, wherein the application includes processor executable instructions for displaying multiple objects that are displayable through user interaction with the application;
receiving a selection of a first object of the multiple objects;
receiving selections of subsequent objects of the multiple objects;
displaying entry points to contextually associated and selected objects with the first computer system;
displaying an active context window in a display of the first computer system that includes an active context list, wherein the active context list includes predetermined labels to identify the contextually associated and selected objects as being contextually associated with one or more other objects, the predetermined labels are initially not associated with any object identifier and not associated with any active link to an object prior to receiving selections of the entry points to the contextually associated and selected objects, and the labels include content-derived specific names;
receiving selections of the entry points to the contextually associated and selected objects with the first computer system;
after receiving the selections of the entry points to the contextually associated and selected objects:
  recording in the active context list in the display of the first computer system identifiers and active links of the contextually associated and selected objects (i) whose entry points were selected and (ii) that are identified by the labels so as to be identified as being contextually associated with each other, wherein recording in the active context list includes using filters to automatically record at least a subset of the identifiers and active links of the contextually associated and selected objects whose entry points were selected by correlating the labels in the active context list with name data in at least a subset of the contextually associated and selected objects whose entry points were selected; and
  automatically associating and displaying the recorded identifiers and active links of the contextually associated and selected objects whose entry points were selected with the labels; and
transmitting an active context object from the first computer system to a second computer system that allows the second computer system to display the active context window including the active context list having the recorded identifiers and active links of the contextually associated and selected objects.

2. The method of claim 1 further comprising:
interacting with the active context list to navigate among the objects whose entry points have been selected by a user and identified as being contextually associated with each other.

3. The method of claim 1 further comprising:
displaying the active context list in a persistent window.

4. The method of claim 1 wherein each entry point is a link to one of the objects, the method further comprising:
monitoring user interaction; and
opening windows to display the objects after receiving the selections of entry points to the objects.

5. The method of claim 1 further comprising:
monitoring user interaction with the application;
receiving a selection from the active context list of one of the objects having a recorded identifier and active links in the active context list; and
displaying the selection of the object corresponding to the selection from the active context list.

6. The method of claim 1 wherein receiving selection of entry points to the objects comprises receiving selection of entry points from a first user, the method further comprising:
transmitting a note to a second user that includes computer readable data for displaying the active context list; and
displaying the active context list in a display viewable to the second user, the active context list having the recorded identifiers and active links of the objects that have been selected by the first user and identified as being contextually associated with each other.

7. The method of claim 1 wherein objects are identified as being contextually associated with each other pursuant to a predetermined list of objects.

8. The method of claim 1 further comprising:
receiving information associated with one or more of the objects identified as being contextually associated with each other; and
displaying the active context list upon receipt of the information.

9. The method of claim 8 wherein the information is caller-ID information.

10. The method of claim 1 wherein each object is selected from the group comprising: a web page, a file, and a graphic image.

11. The method of claim 1 further comprising:
rolling-over a recorded identifier of one of the objects to obtain information associated with the object.

12. The method of claim 1 wherein the software application resides on a server computer of the information system, and the display is coupled to a client computer system having electronic access to the server computer.

13. The method of claim 1 further comprising:
for each object, processing rules stored in the electronic information system to determine whether to identify the object as contextually associated with the other objects.

14. An information system comprising:
processor;
memory coupled to the processor, wherein the memory includes instructions and data that program the processor to configure the information system into a machine to:
display objects of a software application,
receive a selection of a first object of multiple objects,
receive selections of subsequent objects of the multiple objects,
receive selections of entry points to the selected objects,
display an active context window including an active context list, wherein the active context list includes predetermined labels to identify the selected objects whose entry points were selected as being contextually associated with one or more other objects, and
automatically populate the active context list with identifiers and active links to the contextually associated objects after receiving the selections of entry points to the selected objects, wherein to automatically populate the active context list includes using filters to automatically record at least a subset of the identifiers a nd active links by correlating labels in the active context list with name data in at least a subset of the selected objects whose entry points were selected;

a display, coupled to the processor, for displaying a user interface, wherein the user interface includes the active context window and the entry points, wherein the active context list includes the predetermined labels, the predetermined labels are initially not associated with any object identifier and not associated with any active link to an object prior to receiving selections of the entry points to the selected objects, and the labels include content-derived specific names;

wherein (i) the contextually associated objects are associated with the entry points in the user interface, (ii) the identifiers and active links to the contextually associated and selected objects are recorded in the active context window after selection of the entry points and after the objects are identified as being contextually associated, (iii) each identifier and active link are associated with one of the predetermined labels, and (iv) the recorded identifiers and active links within the active context window allow a user to navigate to contextually associated and selected objects through interaction with the active context window; and the memory further includes processor executable instructions to allow a user to transmit an active context object to a computer system that allows the computer system to display the active context window including the populated active context list.

15. The information system of claim 14 wherein the user interface further comprises:

multiple windows with each window displaying a separate one of the objects.

16. The information system of claim 15 wherein the active context window is displayed separately from the multiple windows displaying the objects.

17. The information system of claim 14 wherein the user interface further comprises:

a pop-up window.

18. A computer system comprising:

means for accessing a software application executing on a processor of an information system, wherein the application includes processor executable instructions for displaying multiple objects that are displayable through user interaction with the application;

means for receiving a selection of a first object of the multiple objects;

means for receiving selections of subsequent objects of the multiple objects;

means for displaying entry points to contextually associated and selected objects with the computer system;

means for displaying an active context window in a display of the computer system that includes an active context list, wherein the active context list includes predetermined labels to identify the contextually associated and selected objects as being contextually associated with one or more other objects, the predetermined labels are initially not associated with any object identifier and not associated with any active link to an object prior to receiving selections of the entry points to the contextually associated and selected objects, and the labels include content-derived specific names;

means for receiving selections of the entry points to the contextually associated and selected objects with the computer system;

means for recording in the active context list, after receiving the selections of the entry points to the contextually associated and selected objects, identifiers and active links of the contextually associated and selected objects (i) whose entry points were selected and (ii) that are identified by the labels so as to be identified as being contextually associated with each other, wherein the means for recording in the active context list includes using filters to automatically record at least a subset of the identifiers and active links of the contextually associated and selected objects whose entry points were selected by correlating the labels in the active context list with name data in at least a subset of the contextually associated and selected objects whose entry points were selected;

means for, after receiving the selections of the entry points to the contextually associated and selected objects, automatically associating and displaying the recorded identifiers and active links of the contextually associated and selected objects whose entry points were selected with the labels;

means for displaying the active context window; and means for transmitting an active context object to a second computer system that allows the second computer system to display the active context window including the active context list having the recorded identifiers and active links of the contextually associated and selected objects.

19. A method of using a computer system to provide context information associated with multiple objects available for display, the method comprising:

performing by a processor executing code in the computer system to configure the computer system into a machine:

providing information to a client computer system to allow the client computer system to display multiple objects and entry points to contextually associated objects of a software application;

providing information to the client computer system to allow the client computer system to display an active context window in a display that includes an active context list, wherein the active context list includes predetermined labels to identify contextually associated objects as being contextually associated with one or more other objects, the predetermined labels are initially not associated with any object identifier and not associated with any active link to an object prior to receiving selections of the entry points to the contextually associated objects, and the labels include content-derived specific names;

receiving a selection of a first object of the multiple objects;

receiving selections of subsequent objects of the multiple objects;

receiving selections of the entry points to the contextually associated and selected objects;

after receiving the selections of the entry points to the contextually associated and selected objects:

recording, into the active context list, identifiers and active links of the contextually associated and selected objects (i) whose entry points were selected and (ii) that are identified by the labels so as to be identified as being contextually associated with each other, wherein recording in the active context list includes using filters to automatically record at least a subset of the identifiers and active links of the contextually associated and selected objects whose entry points were selected by correlating the labels in the active context list with name data in at least a subset of the contextually associated and selected objects whose entry points were selected; and automatically associating and displaying the recorded identifiers and active links of the contextually associated and selected objects whose entry points were selected with the labels;

providing information to the client computer system to allow the client computer system to display the active context window that includes the active context list; and transmitting an active context object to a second client computer system that allows the second computer system to display the active context window including the active context list having the recorded identifiers and active links of the contextually associated and selected objects.

20. A non-transitory, computer readable medium comprising code encoded thereon and executable by a processor to configure a computer system into a machine for:

accessing a software application executing on the computer system, wherein the application includes processor executable instructions for displaying multiple objects that are displayable through user interaction with the application;

receiving a selection of a first object of the multiple objects;

receiving selections of subsequent objects of the multiple objects;

displaying entry points to contextually associated and selected objects with the computer system;

displaying an active context window in a display of the computer system that includes an active context list, wherein the active context list includes predetermined labels to identify the contextually associated and selected objects, the predetermined labels are initially not associated with any object identifier and not associated with any active link to an object prior to receiving selections of the entry points to the contextually associated and selected objects, and the labels include content-derived specific names;

receiving selections of the entry points to the contextually associated and selected objects with the computer system;

after receiving the selections of the entry points to the contextually associated and selected objects:

recording in the active context list in the display of the computer system identifiers and active links of the contextually associated and selected objects (i) whose entry points were selected and (ii) that are identified by the labels so as to be identified as being contextually associated with each other, wherein recording in the active context list includes using filters to automatically record at least a subset of the identifiers and active links of the contextually associated and selected objects whose entry points were selected by correlating the labels in the active context list with name data in at least a subset of the contextually associated and selected objects whose entry points were selected; and automatically associating and displaying the recorded identifiers and active links of the contextually associated and selected objects whose entry points were selected with the labels; and transmitting an active context object from the computer system to a second computer system that allows the second computer system to display the active context window including the active context list having the recorded identifiers and active links of the contextually associated and selected objects.

21. The non-transitory, computer readable medium of claim 20 wherein the code is further executable by the processor for:

interacting with the active context list to navigate among the objects whose entry points have been selected by a user and identified as being contextually associated with each other.

22. The non-transitory, computer readable medium of claim 20 wherein the code is further executable by the processor for:

displaying the active context list in a persistent window.

23. The non-transitory, computer readable medium of claim 20 wherein the code is further executable by the processor for:

monitoring user interaction; and opening windows to display the objects after receiving the selections of entry points to the objects.

24. The non-transitory, computer readable medium of claim 20 wherein the code is further executable by the processor for:

monitoring user interaction with the application;

receiving a selection from the active context list of one of the objects having a recorded identifier and liking data in the active context list; and displaying the selection of the object corresponding to the selection from the active context list.

25. The non-transitory, computer readable medium of claim 20 wherein the code is further executable by the processor for:

receiving selection of entry points from a first user, the method further comprising:

transmitting a note to a second user that includes computer readable data for displaying the active context list; and displaying the active context list in a display viewable to the second user, the active context list having the recorded identifiers and active links of the objects that have been selected by the first user and identified as being contextually associated with each other.

26. The non-transitory, computer readable medium of claim 20 wherein objects are identified as being contextually associated with each other pursuant to a predetermined list of objects.

27. The non-transitory, computer readable medium of claim 20 wherein the code is further executable by the processor for:

receiving information associated with one or more of the objects identified as being contextually associated with each other; and displaying the active context list upon receipt of the information.

28. The non-transitory, computer readable medium of claim 27 wherein the information is caller-ID information.

29. The non-transitory, computer readable medium of claim 20 wherein each object is selected from the group comprising: a web page, a file, and a graphic image.

30. The non-transitory, computer readable medium of claim 20 wherein the code is further executable by the processor for:

rolling-over a recorded identifier of one of the objects to obtain information associated with the object.

* * * * *